United States Patent Office 3,194,782
Patented July 13, 1965

3,194,782
TITANIA-FILLED LINEAR POLYESTER MOLDING
RESIN OF HIGH DIELECTRIC CONSTANT
Richard G. Devaney, George R. Greear, and John W.
Tamblyn, Kingsport, Tenn., assignors to Eastman
Kodak Company, Rochester, N.Y., a corporation of
New Jersey
No Drawing. Filed Oct. 30, 1961, Ser. No. 148,723
6 Claims. (Cl. 260—40)

This invention relates to plastic compositions having high dielectric constants. More particularly, it relates to plastic compositions containing an inorganic filler which imparts high dielectric constants thereto.

The preparation of tough, moldable compositions having high dielectric constants has been attended with considerable difficulty. In the case of polyester resins it has been very difficult to obtain the desired degree of toughness required for dielectric uses without inhibiting some of the other required properties or preventing the compositions from being capable of injection molding. Titanium dioxide has been tried in other types of resins and in concentrations of 80% by weight or greater has been somewhat successful in increasing the dielectric properties because of the high dielectric constants. However, in most cases the toughness of the polymer has been less and the dielectric constant has not been increased as high as would be best for commercial applications. Also, such compositions have generally been subject to considerable loss of energy, as evidenced by high dissipation factors. Accordingly, the obtaining of a tough and durable as well as economical polyester molding composition of the high dielectric constant required for ordinary condenser and other electrical usage is highly desirable.

One object of this invention is to provide a tough polyester molding composition having a high dielectric constant and a relatively low dissipation factor. It is another object of this invention to provide a method for the preparation of a tough, injection moldable polyester composition having a high dielectric constant without the incorporation therein of exceptionally high amounts of expensive pigment-grade fillers. These and other objects of this invention will be apparent from the description and claims which follow.

We have found surprisingly that a composition which can be injection molded into a tough composition having both a high dielectric constant and a relatively low dissipation factor and high strength may be prepared by the incorporation of not greater than 80% by weight of said composition of a coarse, substantially white titania having the properties of a slightly reduced rutile titanium dioxide. It is known that commercially available titanium dioxide can be specially heat-treated, tinted, and mixed with a binder in such a way as to impart to shellac a dielectric constant of up to about 35 when added thereto in amounts of not less than 90% by weight. It was, therefore, completely unexpected and very surprising to find that the above-mentioned special type of titania having the properties of a slightly reduced coarse substantially white rutile titanium dioxide would impart even higher dielectric constants to polyester compositions when incorporated therein in percentages as low as 60% by weight or less. We have found that the polyester compositions to which this particular titanium dioxide can be added with the best results in the way of producing especially high dielectric constants are polyesters prepared by the condensation of one or more carboxyl-containing acids or their esters and one or more glycols, for example, such as those described in U.S. Patent No. 2,901,466. We have found that especially good results in obtaining a low dissipation factor as well are produced when such polyesters are prepared from meta- and para-dicarboxy diphenyl sulfones and their $\beta$-hydroxyalkyl diesters or p,p'-sulfonyl dibenzoic acid diesters, the preparation of which is described in U.S. Patents Nos. 2,744,078 and 2,744,088 through 2,744,097, and others. We do not wish to be bound by any theory as to the phenomenon of the especially high dielectric constant coupled with the ordinarily low dissipation factor and high strength imparted to linear polyesters without the simultaneous removal of the desirable toughness usually required of such compositions. One possibility, however, is that for some unknown reason the specific properties of the polyester vehicle or medium in which they are used in some way unite such that a high dielectric constant is obtained with the use of only a relatively small amount of this specific titanium dioxide. We prefer an average titanium dioxide particle size falling within the about 80 to about 325 mesh range, e.g., such that about 25% pass as 325 mesh. We may characterize the titanium dioxide used in this invention as titania having the properties of a slightly reduced rutile titanium dioxide. These properties are typified by the increased dielectric constant and the high strength imparted to the linear polyesters in which this special titania is used. Any source of titania may be used, provided it exhibits these properties of a slightly reduced rutile titanium dioxide. However, for optimum results the particle size should be relatively coarse, that is, of the above particle size range and substantially white, that is, no darker than a slight greyish tint. One way of producing these properties is to reduce rutile titanium dioxide under hydrogen at a temperature of from about 500–1000° C. for a period of from about 15 minutes to about an hour.

The titanium dioxide used in this invention can be incorporated or blended into the particular polyester compositions in which it is used by the conventional methods utilized for blending such materials into other resins or plastics. Typical of such methods that can be suitably employed are milling on heated rolls, deposition from solvents, and dry blending. We have found that from about 60 to 80% by weight of our special form of rutile titanium dioxide produces the best results.

Our invention will be more fully understood by the following examples which are illustrative only and not intended to be limiting in any manner.

EXAMPLE I 35 parts by weight of a linear polyester made from 1,5-pentanediol and a mixture of 80 mole percent sebacic acid and 20 mole percent 4,4'-dicarboxyl diphenyl sulfone were compounded on hot rolls with 65 parts by weight of white titania having an average having an average particle size such that about 25% passes 325 mesh and having the properties of a slightly reduced rutile titanium dioxide (Ti-Pure VG, a ceramic-grade pigment manufactured by Du Pont). Test specimens to be used in the computation of electrical properties were prepared by injection molding discs 2 inches in diameter and about ⅛ inch thick. Computations of the dielectric constants and dissipation factors for this composition and for similar compositions containing the same amount of other types of titanium dioxide and titanium-containing compounds having the same amount of filler and similarly prepared, as well as a control containing no filler, were made at 25° C. and a frequency of 100 cycles per second after conditioning at 73° F. and 50% R.H. The results of these computations are given in Table 1 below.

*Table 1.—Dielectric properties of pigmented polyester*

Filler:  Dielectric constant
- Coarse, white, 80–325 mesh $TiO_2$ as above ____ 36.7
- Titanox RA–60 [1] _____ 15.5
- HG [2] _____ 14.9
- Titanox RA–10 [1] _____ 14.4
- TG [1] _____ 13.3
- Barium titanate _____ 16.4
- None _____ 6.5

[1] A rutile-type $TiO_2$ product of Titanium Pigment Corporation.
[2] A titania produced by Titanium Alloy Manufacturing Company.

EXAMPLE II 25 parts by weight of linear polyester made from 1,5-pentanediol and a mixture of 80 mole percent azelaic acid and 20 mole percent 4,4'-dicarboxy diphenyl sulfone were compounded as in Example I with 75 parts by weight of the same type of titanium dioxide as that used in Example I. Similar compositions were prepared with other fillers, including different forms of titanium dioxide, barium titanate and mixed fillers in the same amounts and analyzed for dielectric properties in accordance with the procedure of Example I after being fashioned into discs by the same procedure as that used in Example I. Table 2 below gives the dielectric properties of these compositions.

*Table 2.—Dielectric properties of pigmented polyester*

| Filler | Dielectric constant | Dissipation factor (percent) |
|---|---|---|
| $TiO_3$ Pigment of Example I | 50 | 1.8 |
| Titanox RA–50 [1] | 21.0 | 1.0 |
| Titanox AA (Anatase) [2] | 24.2 | 2.4 |
| Barium titanate | 26.2 | 2.3 |
| 92:8 (by weight) barium titanate: barium zirconate | 26.3 | 8.9 |
| 84:16 (by weight) barium titanate:barium stannate | 26.7 | 4.0 |
| None | 6.5 | 3.0 |

[1] Rutile-type $TiO_2$ pigment of Titanium Pigment Corporation.
[2] Anatase-type $TiO_2$ pigment of Titanium Pigment Corporation.

EXAMPLE III

Several different resin compositions, all containing 65 parts by weight coarse, substantially white titanium dioxide of Example I having the properties of a slightly reduced rutile titanium dioxide and 35 parts by weight resin were prepared and molded into discs as in Example I. The dielectric properties of these compounds as determined under the conditions given in Example I are reported in the following table, Table 3.

*Table 3.—Dielectric properties of resins pigmented with the special titanium dioxide pigment of this invention*

Resin:  Dielectric constant
- Polyethylene (density about 0.91) _____ 9.6
- Silicone elastomer SE 450 [1] _____ 24.1
- Polyester from 1,4-cyclohexanedimethanol and a mixture of 80 mole percent sebacic acid and 20 mole percent terephthalic acid _____ 34.8

[1] A product of General Electric Company.

EXAMPLE IV 35 parts by weight of a linear polyester made from 1,4-cyclohexanedimethanol and a mixture of 60 mole percent sebacic acid with 40 mole percent of terephthalic acid were hot-roll compounded with 65 parts by weight of rutile pigment (R 750–1A, New Jersey Zinc Company). This gave an easily moldable composition which was formed into discs 2 inches in diameter and 0.125 inch thick for electrical tests, and into 1/16 inch thick tensile bars for measurements of tensile strength and elongation. The results are shown in Table 4. Similar compoundings and test specimens were prepared with the same rutile sample after the latter had been first subjected to the reducing conditions noted in Table 4. The electrical and mechanical properties of these compoundings are also included in Table 4. It is apparent that the slightly reduced properties imparted to the rutile titania produced substantial and unexpected improvements in both electrical and mechanical properties of the pigmented plastic compoundings.

*Table 4*

| Reduction conditions | Dielectric constant (at 25° C. and 1,000 cycles/ second) | Mechanical properties | |
|---|---|---|---|
| | | Tensile strength p.s.i. | Percent elongation at break |
| None (used pigment as received) | 10.8 | 2,890 | 80 |
| Under hydrogen at 900° C. for 15 minutes | 12.8 | 3,210 | 100 |
| Under hydrogen at 500° C. for 30 minutes | 12.7 | 3,640 | 100 |

It can be seen from the above table that the polyester containing our special titanium dioxide pigment showed a substantially higher dielectric constant than the other polymers.

In all of the above examples in addition to the surprisingly high dielectric constants the polyester resin compositions showed a toughness and moldability equal or superior to those compositions containing fillers other than the special titania of this invention having the properties of a slightly reduced rutile $TiO_2$ and to those compositions containing other than polyester resins. By comparison of the dielectric constants and the dissipation factors of the various compositions used in Tables 1, 2 and 3 it is readily observable that in substantially all cases where our titanium dioxide was used in a polyester resin composition the dielectric constant was relatively high, sometimes up to 50, and that where measured the dissipation factor was relatively low in comparison to other compositions. The dielectric constant in all cases where our special type of titanium dioxide was used in a polyester resin was greater than about 12.5. We have thus provided a novel injection-moldable plastic composition having a higher dielectric constant than ever before obtainable in a polyester containing a comparable amount of filler. In addition, the composition of our invention exhibits excellent toughness and a low dissipation factor.

The invention has been described in detail with particular reference to preferred embodiments thereof, but it will be understood that variations and modifications can be effected within the spirit and scope of the invention as described hereinabove and as defined in the appended claims.

We claim:

1. A plastic composition capable of being injection molded comprising poly(1,4 - cyclohexylenedimethylene terephthalate) containing from about 60 to about 80 percent by weight of said poly(1,4-cyclohexylenedimethylene terephthalate) of substantially white ceramic-grade rutile titanium dioxide having the properties of a slightly reduced titanium dioxide and an about 80–325 mesh particle size, said composition having a dielectric constant of from about 12.5 to about 50, a dissipation factor of less than about 2 percent, and an elongation of at least about 100 percent.

2. A shaped article adapted for high dielectric constant usages comprising a linear polyester product of 1,4-cyclohexanedimethanol and at least one compound selected from the group consisting of dicarboxylic acids and diesters of dicarboxylic acids and from about 60 to about 80 percent by weight of said article of substantially white ceramic-grade titanium dioxide having the properties of a slightly reduced titanium dioxide and a fineness of about 80–325 mesh, said polyester product having a dielectric constant of at least about 13.

3. The article of claim 2 wherein the shaped article is a condenser.

4. A tough injection-moldable composition comprising a linear polyester which is a condensation polymer of 1,5-pentanediol, sebacic acid and 4,4'-dicarboxy diphenyl sulfone, said polyester containing from about 60 to about 80 percent by weight of said polyester of a substantially white ceramic-grade rutile titanium dioxide having the properties of a slightly reduced titanium dioxide and having an average particle size falling within the about 80 to about 325 mesh range, said composition having a dielectric constant of from about 30 to about 50.

5. A tough injection-moldable composition comprising a linear polyester which is a condensation polymer of 1,5-pentanediol, azelaic acid and 4,4'-dicarboxy diphenyl sulfone, said polyester containing from about 60 to about 80 percent by weight of said polyester of a substantially white ceramic-grade rutile titanium dioxide having the properties of a slightly reduced titanium dioxide and having an average particle size falling within the about 80 to about 325 mesh range, said composition having a dielectric constant of from about 30 to about 50.

6. A tough injection-moldable composition comprising a linear polyester which is a condensation polymer of cyclohexanedimethanol and terephthalic acid, said polyester containing from about 60 to about 80 percent by weight of said polyester of a substantially white ceramic-grade rutile titanium dioxide having the properties of a slightly reduced titanium dioxide and having an average particle size falling within the about 80 to about 325 mesh range, said composition having a dielectric constant of from about 30 to about 50.

References Cited by the Examiner
UNITED STATES PATENTS

| | | | |
|---|---|---|---|
| 2,665,263 | 1/54 | Howald | 260—40 |
| 2,866,768 | 12/58 | Bolstad | 260—47 |
| 3,018,186 | 1/62 | Jenkins | 106—300 |

MORRIS LIEBMAN, *Primary Examiner.*

MILTON STERMAN, *Examiner.*